United States Patent Office 3,501,539
Patented Mar. 17, 1970

3,501,539
PROCESS FOR THE PRODUCTION OF VINYL-
ICALLY CHLORINATED OLEFINS
Danford H. Olson and George M. Bailey, Littleton, Colo.,
assignors to Marathon Oil Company, Findlay, Ohio, a
corporation of Ohio
No Drawing. Filed Oct. 20, 1965, Ser. No. 499,041
Int. Cl. C07c 21/06
U.S. Cl. 260—656                                6 Claims

ABSTRACT OF THE DISCLOSURE

A method for the production of vinyl chloride by the reaction of ethylene in the gas phase with cupric chloride at a temperature in the range of from 475° C. to 525° C. and at a flow rate of from 12 to 20 cc. of gas stream per minute per gram of cupric chloride. A second embodiment comprises reaction at a temperature within the range 525° C. to 550° C. at a flow rate of from 17 to 24 cc. of gas stream per minute per gram of cupric chloride.

---

This invention relates to the production of vinylically chlorinated olefins. More particularly the invention relates to the production of vinyl chloride, tetrachloroethylene, and other chlorinated olefins by the reaction of an olefinically unsaturated hydrocarbon in the gas phase with cupric chloride.

Although vinyl chloride is an extremely valuable chemical intermediate, all of the presently known methods for its production contain certain disadvantages. One method for producing vinyl chloride is by the addition reaction of hydrogen chloride and acetylene. Since acetylene is expensive and potentially explosive, if improperly handled, its use in the production of vinyl chloride is undesirable. The cracking of 1,2-dichloroethane has been extensively used to produce vinyl chloride. The major disadvantage of this cracking process is the necessity of producing 1,2-dichloroethane as an intermediate which adds a costly step to the process. A further process for producing vinyl chloride involves the reaction of ethylene with chlorine gas. A extreme hazards attend the mixing of reactive chlorine gas with organic material, this process has not gained commercial acceptance.

In still another method, ethylene is reacted with hydrogen chloride and oxygen in the presence of cupric chloride and other salts, but this latter process requires more severe conditions and is not applicable to produce the wide range of products of the present invention.

Accordingly, it is an object of this invention to provide a process for preparing vinylically chlorinated olefins, selectively and in good yields, from inexpensive, readily available, and easily handled raw materials.

It is another object of the invention to provide a process for preparing vinyl chloride, selectively and in good yield by the reaction of ethylene with cupric chloride under carefully controlled conditons of temperature and contact times.

It is a further object of the invention to provide a process for the preparation of tetrachloroethylene selectively, and in good yield by a variation of the method employed for the preparation of vinyl chloride.

The manner in which the foregoing and other objects are achieved will become apparent from the following detailed description of the best mode which has been contemplated for carrying out the invention.

The reaction of ethylene and cupric chloride is not new. However, prior reactions of these materials were conducted at relatively low temperatures with the products consisting essentially only of 1,2-dichloroethane. In fact the reaction has been reported to give yield of 1,2-dichloroethane as high as from 95% to 99% of the theoretical.

It has now been discovered after extensive study of the relationship of products and yields to the ranges of temperatures and contact times employed in the reaction of ethylene and cupric chloride, that by conducting the reaction under certain conditions, selectivity and high yields of vinylically chlorinated olefin products can be realized.

In particular, it has now been found that by reacting ethylene with a cupric chloride catalyst at a temperature in the range of from 400° C. to 550° C. and at a flow rate of from 1 to 44 cc. of gas per minute per gram of cupric chloride, substantial amounts of vinyl chloride, and/or tetrachloroethylene can be produced. In addition to vinyl chloride, and tetrachloroethylene the reaction produces other chlorinated hydrocarbons including di-, tri-, and tetrachlorinated ethanes and ethylenes. The vinyl chloride or tetrachloroethylene can easily be separated and recovered from the other chlorination products by methods well known to the art.

The remaining chlorinated hydrocarbons can then either be cracked to produce further amounts of vinyl chloride or recycled for further reaction with the cupric chloride catalyst to produce substantial amounts of tetrachloroethylene.

Anhydrous cupric chloride ($CuCl_2$) is employed as the catalyst. It is preferably used in the form of a mixture with an inert material such as carborundum or asbestos, which functions to disperse the catalyst. The inert material used is not important so long as it is inert under the reaction conditions. The weight ratio of inert material to cupric chloride catalyst is also not critical. The preferred range, however, is from about 1:1 to about 3:1 parts by weight of inert material to cupric chloride.

In a preferred embodiment of the invention, ethylene is used as the feed material. When ethylene is employed, substantial amounts of vinyl chloride are obtained by passing the ethylene gas over the mixture of anhydrous cupric chloride and inert material at a temperature of from 400° C. to 550° C. at a flow rate of from 1 to 40 cc. of ethylene per minute per gram of cupric chloride. Preferably, a temperature of from 450° C. to 550° C. and a flow rate from 12 and 42 cc. per minute per gram of cupric chloride is employed.

Mixtures of ethylene and ethane can be employed as the feed material, however, very little vinyl chloride is actually obtained from the ethane. The ethylene or ethylene-ethane gas mixture may also be mixed with an inert gas diluent, such as nitrogen, or other gases which may enter into side reactions without substantially inhibiting the primary reaction.

The reaction may be controlled so that vinyl chloride or tetrachloroethylene may be obtained selectively and in good yield. Other products obtained in minor proportion include trans-dichloroethylene, cis-dichloroethylene, 1,2-dichloroethane, trichloroethylene, 1,1,2 - trichloroethane and 1,1,2,2-tetrachloroethane. The major products are easily separated from the other chlorinated products by standard methods well known to the art, i.e., selective absorption, or conventional fractional distillation. The chlorinated ethanes and ethylenes can then be recycled for further reaction with a cupric chloride catalyst to produce significant amounts of tetrachloroethylene. Alternatively, the other chlorinated products can be cracked by conventional methods producing further amounts of vinyl chloride.

Thus, the process of the invention could be used to produce other chlorinated hydrocarbons, however, by careful control of the reaction conditions and/or by cracking or recycling the product stream, the process can be used to produce primarily vinyl chloride or tetrachloroethylene.

In this reaction, the cupric chloride is reduced to cuprous chloride. Cupric chloride can be regenerated by reacting the cuprous chloride with hydrogen chloride in the presence of an oxygen containing gas. This regeneration reaction can be accomplished at temperatures of from 250° C. to 550° C.

The present invention and certain specific embodiments are illustrated in detail in the following examples.

EXAMPLE 1

A chlorination catalyst is prepared by mixing 25 grams of anhydrous cupric chloride and 35 grams of silicon carbide having a particle size of between 4 and 6 mesh. The catalyst is placed in a Vycor tube reactor having a gas inlet at the top and a gas vent at the bottom. Ethylene was passed over the catalyst at various temperatures at a flow rate of 1 cc. per minute per gram of cupric chloride, at various temperatures. The products were analyzed by gas liquid chromatography and the results are summarized in Table 1.

TABLE 1

| Temperature, °C | 300 | 350 | 400 | 450 |
|---|---|---|---|---|
| Vinyl chloride | 0.175 | 2.99 | 4.73 | 0.372 |
| Trans-dichloroethylene | 0.084 | 2.63 | 5.95 | 0.89 |
| Cis-dichloroethylene | 0.229 | 0.52 | 9.03 | 1.41 |
| 1,2-dichloroethane | 77.3 | 63.5 | 9.61 | 0.38 |
| Trichloroethylene | | 1.93 | 11.1 | 5.60 |
| 1,1,2-trichloroethane | 3.25 | 9.61 | 4.97 | 0.49 |
| Tetrachloroethylene | 0.079 | 2.08 | 12.59 | 84.20 |
| 1,1,2,2-tetrachloroethane | 0.551 | 5.48 | 8.02 | 1.35 |
| Ethylene conversion, percent | 92.8 | 85.5 | 97.3 | 97.9 |

This table shows the effect of temperature on the yield of product at the constant flow rate, and how the temperature can be controlled to favor formation of specific products.

EXAMPLE 2

A chlorination catalyst is prepared and placed in the reactor as in Example 1. The temperature is maintained at 500° C. while gaseous ethylene is passed over the catalyst at various flow rates. The products are analyzed by gas-liquid chromatography and the results are presented in Table 2.

TABLE 2.—MOLE PERCENT OF PRODUCTS AT 500° C. AT VARIABLE FLOW RATE

| Flow, cc./min./g. of CuCl$_2$ | 0.52 | 5.6 | 13.6 | 19.2 | 29.0 |
|---|---|---|---|---|---|
| Vinyl chloride | Trace | 18.0 | 32.5 | 31.2 | 10.1 |
| Trans-dichloroethylene | 2.20 | 9.27 | 7.84 | 5.16 | 4.65 |
| Cis-dichloroethylene | 3.27 | 11.4 | 9.83 | 7.29 | 6.02 |
| 1,2-dichloroethane | 2.28 | 7.63 | 18.8 | 22.1 | 50.3 |
| Trichloroethylene | 13.2 | 16.0 | 11.2 | 8.00 | 5.60 |
| 1,1,2-trichloroethane | 2.97 | 3.58 | 7.31 | 3.46 | 8.85 |
| Tetrachloroethylene | 47.7 | 10.1 | 9.96 | 7.91 | 5.15 |
| 1,1,2,2-tetrachloroethane | 2.73 | 0.98 | 2.12 | 1.55 | 2.70 |
| Ethylene conversion, percent | 100 | 87.5 | 70.6 | 65.0 | 75.0 |

These results indicate the wide variation in products obtainable according to the flow rate employed at a constant temperature of 500° C. In a most preferred form of the process, the temperature is in the range of from 475° C. to 525° C. and the flow rate is from 12 to 20 cc. of gas stream per minute per gram of cupric chloride, and in a second most preferred form of the present invention the temperature is from 525° C. to 550° C. and the flow rate is from 17 to 24 cc. of gas stream per minute per gram of cupric chloride.

EXAMPLE 3

The reaction was carried out as in Example 2 except that the flow rate varied as shown in the table, and the temperature was kept constant at 450° C. The analysis of products is as follows:

TABLE 3.—MOLE PERCENT OF PRODUCTS AT 450° C. AT A VARIABLE FLOW RATE

| Flow, cc./min./g. of CuCl$_2$ | 1.0 | 2.8 | 6.4 | 8.6 |
|---|---|---|---|---|
| Vinyl chloride | 0.369 | 17.6 | 16.7 | 14.7 |
| Trans-dichloroethylene | 0.89 | 8.49 | 4.16 | 4.23 |
| Cis-dichloroethylene | 1.46 | 11.4 | 8.37 | 7.66 |
| 1,2-dichloroethane | 0.38 | 23.2 | 49.0 | 53.3 |
| Trichloroethylene | 5.60 | 11.3 | 3.96 | 2.88 |
| 1,1,2-trichloroethane | 0.49 | 7.38 | 6.10 | 5.72 |
| Tetrachloroethylene | 84.20 | 10.58 | 4.69 | 3.32 |
| 1,1,2,2-tetrachloroethane | 1.35 | 3.77 | 2.73 | 2.32 |
| Ethylene conversion, percent | 97.9 | 78.9 | 58.4 | 61.0 |

EXAMPLE 4

The reaction was conducted as in Example 2, with the exception that the flow rate was varied as shown and the temperature was kept constant at 550° C.

TABLE 4.—MOLE PERCENT PRODUCTS AT 550° C. AT A VARIABLE FLOW RATE

| Flow, cc./min./g. of CuCl$_2$ | 4.4 | 17.8 | 23.8 | 42.8 |
|---|---|---|---|---|
| Vinyl chloride | 9.83 | 31.4 | 33.7 | 27.7 |
| Trans-dichloroethylene | 10.1 | 5.91 | 6.53 | 5.63 |
| Cis-dichloroethylene | 12.1 | 7.30 | 9.31 | 7.08 |
| 1,2-dichloroethane | 23.6 | 24.6 | 22.0 | 34.5 |
| Trichloroethylene | 21.2 | 6.54 | 8.92 | 7.42 |
| 1,1,2-trichloroethane | 8.88 | 4.51 | 5.20 | 3.08 |
| Tetrachloroethylene | 9.91 | 4.72 | 6.98 | 3.04 |
| 1,1,2,2-tetrachloroethane | 0.27 | 0.64 | 1.05 | 0.48 |
| Ethylene conversion, percent | 90.1 | 63.1 | 62.8 | 56.8 |

It is seen from the above, that by careful control of the reaction conditions, particularly temperature and flow rate, high selectivity and good yields of vinyl chloride and/or tetrachloroethylene can be realized.

The following are certain preferred embodiments of the invention and are presented by way of further illustration only.

EXAMPLE 5

A chlorination catalyst is prepared and placed in a reactor according to the method of Example 1. The temperature is maintained at 500° C. and gaseous ethylene is passed over the catalyst at a flow rate of 13.6 cc. of ethylene per minute per gram of cupric chloride.

The products of the above reaction were analyzed by gas-liquid chromatography and it was found that there was a 70.6% of ethylene dichlorinated products. The analysis of products based on the amount of ethylene consumed was as follows:

| Product: | Mole percent based on ethylene consumed |
|---|---|
| Vinyl chloride | 32.5 |
| Trans-dichloroethylene | 7.84 |
| Cis-dichloroethylene | 9.83 |
| 1,2-dichloroethane | 18.8 |
| Trichloroethylene | 11.2 |
| 1,1,2-trichloroethane | 7.31 |
| Tetrachloroethylene | 9.96 |
| 1,1,2,2-tetrachloroethane | 2.12 |

Thus a 32.5% yield of vinyl chloride is obtained.

The effluent from the reactor is conveyed to a standard separating apparatus where it is separated into three streams. A vinyl chloride stream is conveyed to storage. An ethylene stream is recycled to the chlorination reaction for further production of vinyl chloride. A third stream containing the other chlorinated hydrocarbons is conveyed to a standard cracking unit and cracked by ordinary methods known to the art to produce substantial additional amounts of vinyl chloride.

EXAMPLE 6

A catalyst is prepared and placed in a reactor according to the method of Example 1. The temperature is maintained at 550° C. A gaseous ethylene stream is passed over the catalyst at a flow rate of 23.8 cc. of ethylene per minute per gram of cupric chloride. There is a 62.8% conversion of ethylene to chlorinated products. Based on the amount of ethylene consumed at 33.7% yield of vinyl chloride is obtained.

The products of the chlorination reaction are separated as in Example 5. The vinyl chloride stream is conveyed to storage. The ethylene and chlorinated product stream are recycled to the chlorination reaction for further reaction with cupric chloride. The ethylene reacts with cupric chloride to produe further amounts of vinyl chloride and other chlorinated ethylenes and ethanes. The chlorinated products from the first reaction react with the cupric chloride to produce substantial amounts of tetrachloroethylene, which is separated from the other materials by standard fractional distillation techniques.

Thus by recycling the products this method can be used to produce additional amounts of vinyl chloride and tetrachloroethylene.

EXAMPLE 7

A chlorination catalyst is prepared and placed in a reactor according to the method of Example 1. The temperature is maintained at 450° C. Gaseous ethylene is passed over the catalyst at a flow rate of 1 cc. per minute per gram of cupric chloride. There is a 97.9% conversion of ethylene to chlorinated products. Based on the amount of ethylene consumed, an 84.2% yield of tetrachloroethylene is realized.

EXAMPLE 8

A gas consisting of equal amounts by volume of ethane and ethylene were passed over a cupric chloride catalyst in a reactor as in Example 1 at 470° C. at a flow rate of 1 cc. per minute per gram of catalyst. A 79% conversion of the gas mixture was obtained with the recovered gas being mainly ethane. The product has the following analysis:

| | Mole percent |
|---|---|
| Vinyl chloride | 0.57 |
| Ethyl chloride | 3.68 |
| Trans-dichloroethylene | 4.97 |
| Cis-dichloroethylene | 6.30 |
| 1,2-dichloroethane | 17.69 |
| 1,1,2-trichloroethane | 3.80 |
| Trichloroethylene | 10.62 |
| Tetrachloroethylene | 40.99 |
| Tetrachloroethane | 4.93 |

Thus a yield of close to 41% of tetrachloroethylene was realized.

While there have been described and pointed out the fundamental novel features of the invention as applied to the preferred embodiments, it will be understood that various omissions, substitutions and changes in the form and details of the method illustrated may be made by those skilled in the art without departing from the spirit and scope of the invention. It is the intention, therefore, to be limited only by the following claims.

What is claimed is:
1. A process for producing vinyl chloride comprising:
   (a) passing a gas stream consisting essentially of ethylene over a composition consisting essentially of a mixture of cupric chloride and inert material;
   (b) at a temperature in the range of from 475° C. to 525° C. and at a flow rate of from 12 to 20 cc. of gas stream per minute per gram of cupric chloride, whereby a reaction product wherein the major product is vinyl chloride is obtained.
2. The process of claim 1 which additionally comprises separating the vinyl chloride from the reaction product.
3. A process according to claim 2 wherein after separation of the vinyl chloride, the remaining reaction product is re-cycled to contact with said composition consisting essentially of a mixture of cupric chloride and inert matetrial to yield further amounts of vinyl chloride.
4. A process for producing vinyl chloride comprising:
   (a) passing a gas stream consisting essentially of ethylene over a composition consisting essentially of a mixture of cupric chloride and inert material;
   (b) at a temperature in the range of from 525° C. to 550° C. and at a flow rate of from 17 to 24 cc. of gas stream per minute per gram of cupric chloride, whereby a reaction product is obtained wherein the major product is vinyl chloride.
5. The process of claim 4 which additionally comprises separating vinyl chloride from the reaction product.
6. The process of claim 5 wherein after separation of the vinyl chloride the remaining reaction product is re-cycled to contact with said composition consisting essentially of a mixture of cupric chloride and inert material to yield further amounts of vinyl chloride.

References Cited

UNITED STATES PATENTS

| 2,167,927 | 8/1939 | Groll et al. | 260—656 |
| 2,407,828 | 9/1946 | Gorin. | |

FOREIGN PATENTS

| 705,925 | 3/1965 | Canada. |
| 907,435 | 10/1962 | Great Britain. |
| 536,810 | 2/1957 | Canada. |

LEON ZITVER, Primary Examiner

J. A. BOSKA, Assistant Examiner

U.S. Cl. X.R.

260—654

PO-1050 (5/69)

UNITED STATES PATENT OFFICE
CERTIFICATE OF CORRECTION

Patent No. 3,501,539     Dated March 17, 1970

Inventor(s) D.H.Olson and G.M.Bailey

It is certified that error appears in the above-identified patent and that said Letters Patent are hereby corrected as shown below:

Col. 1, line 44:   "A" should read --As--

Col. 2, line 45:   "12 and" should read --12 to--

Col. 4, line 44:   After "70.6%" insert --conversion--

For "dichlorinated" substitute --to chlorinated--

Col. 5, line 7:    "produe" should read --produce--

SIGNED AND SEALED

FEB 23 1971

(SEAL)
Attest:

Edward M. Fletcher, Jr.
Attesting Officer

WILLIAM E. SCHUYLER, JR.
Commissioner of Patents